(12) United States Patent
Rao (10) Patent No.: US 11,126,391 B2
(45) Date of Patent: Sep. 21, 2021

(54) CONTEXTUAL AND AWARE BUTTON-FREE SCREEN ARTICULATION

(71) Applicant: Harman International Industries, Incorporated, Stamford, CT (US)

(72) Inventor: Rashmi Rao, West Bloomfield, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/763,930

(22) PCT Filed: Jan. 4, 2019

(86) PCT No.: PCT/US2019/012387
§ 371 (c)(1),
(2) Date: May 13, 2020

(87) PCT Pub. No.: WO2019/136277
PCT Pub. Date: Jul. 11, 2019

(65) Prior Publication Data
US 2020/0371733 A1 Nov. 26, 2020

Related U.S. Application Data

(60) Provisional application No. 62/613,659, filed on Jan. 4, 2018.

(51) Int. Cl.
*G06F 3/14* (2006.01)
*B60K 35/00* (2006.01)
*G06F 3/01* (2006.01)

(52) U.S. Cl.
CPC ............ *G06F 3/1423* (2013.01); *B60K 35/00* (2013.01); *G06F 3/017* (2013.01);
(Continued)

(58) Field of Classification Search
CPC ...... G06F 3/1423; G06F 3/017; G06F 3/0481; G06F 2203/04803; B60K 35/00;
(Continued)

(56) References Cited

U.S. PATENT DOCUMENTS

| 6,922,147 B1 | 7/2005 | Viksnins | |
|---|---|---|---|
| 2009/0256813 A1* | 10/2009 | Amici | B60K 35/00 345/173 |

(Continued)

FOREIGN PATENT DOCUMENTS

| DE | 102013221027 A1 | 6/2014 |
|---|---|---|
| EP | 3243687 A1 | 11/2017 |
| JP | 2001280979 A | 10/2001 |

*Primary Examiner* — Christopher E Leiby
(74) *Attorney, Agent, or Firm* — Angela M. Brunetti (57) ABSTRACT

A system for directing content among a plurality of displays. The content may be selected by a user or may be determined by an event, such as a user-interactive input or an input initiated by an event associated with a vehicle system. The input command causes selected content to be moved from a first display to a second display. The input command causes articulation of the second display in order to display the selected content The input command may come from a portable device, or a user interactive command such as a voice command, a visual command such as a gesture, or a touch command. The input command may also come from a vehicle system, such as a navigation system, an infotainment system, a climate control system to name a few.

25 Claims, 5 Drawing Sheets

(52) U.S. Cl.
CPC .... *B60K 2370/115* (2019.05); *B60K 2370/143* (2019.05); *B60K 2370/146* (2019.05); *B60K 2370/148* (2019.05); *B60K 2370/152* (2019.05); *B60K 2370/182* (2019.05); *B60K 2370/21* (2019.05); *B60K 2370/52* (2019.05); *B60K 2370/67* (2019.05); *B60K 2370/73* (2019.05); *B60K 2370/771* (2019.05); *B60K 2370/774* (2019.05); *B60K 2370/788* (2019.05); *B60K 2370/794* (2019.05)

(58) Field of Classification Search
CPC ...... B60K 2370/1529; B60K 2370/115; B60K 2370/143; B60K 2370/771; B60K 2370/146; B60K 2370/73; B60K 2370/52; B60K 2370/774; B60K 2370/148; B60K 2370/1523; B60K 2370/788; B60K 2370/152; B60K 2370/182; B60K 2370/21; B60K 2370/794; B60K 2370/67; G09G 2354/00; G09G 2380/10

See application file for complete search history.

(56) References Cited

U.S. PATENT DOCUMENTS

| | | |
|---|---|---|
| 2012/0268665 A1 | 10/2012 | Yetukuri |
| 2013/0218412 A1 | 8/2013 | Ricci |
| 2014/0280580 A1 | 9/2014 | Langlois et al. |
| 2014/0365126 A1 | 12/2014 | Vulcano et al. |
| 2016/0196800 A1* | 7/2016 | Kim ................ G06F 3/04886 715/771 |
| 2016/0200195 A1* | 7/2016 | Jun ..................... B60K 35/00 715/765 |
| 2017/0313248 A1* | 11/2017 | Kothari ............... G06F 3/0416 |

\* cited by examiner

CONTEXTUAL AND AWARE BUTTON-FREE SCREEN ARTICULATION

CROSS-REFERENCE TO RELATED APPLICATIONS

This application claims priority to U.S. provisional patent application Ser. No. 62/613,659, filed Jan. 4, 2018 entitled "Contextual and Aware Button-free Screen Articulation". The entire contents are herein incorporated by reference.

TECHNICAL FIELD

The inventive subject matter is directed to interaction with a plurality of devices and more particularly to on-screen interaction among a plurality of devices.

BACKGROUND

As vehicles become more connected, a user, and particularly a driver, must balance their desire to stay connected with their desire to stay safe. The connected vehicle creates a need for the user to interact with a plurality of devices and display screens that provide content to the user. As the number of screens and devices increases, so does the need to manage the content and its ability to be viewed by the user. However, interaction with the plurality of devices and display screens should occur in such a manner that cognitive overload is avoided.

SUMMARY

A system for directing content among a plurality of displays. The content may be selected by a user or may be determined by an event, such as a user-interactive input or an input initiated by an event associated with a vehicle system. The input command causes selected content to be moved from a first display to a second display. The input command causes articulation of the second display in order to display the selected content. The input command may come from a portable device, or a user interactive command such as a voice command, a visual command such as a gesture, or a touch command. The input command may also come from a vehicle system, such as a navigation system, an infotainment system, a climate control system to name a few.

A plurality of user profiles may be stored and accessed by the system to display content according to settings that are preferred by a particular user associated with the user profile. A hierarchical scheme may be used to determine which user profile to select from the stored user profiles.

The input command may also have a second action, a second input command that further adjusts the display devices, particularly the display settings of selected content being displayed at the second device. The second input command may be an input command coming from a processor that has analyzed a user's reaction to the action resulting from the first input command.

The input command may cause a motor mechanism to adjust a position or display settings for the second display device to move between concealed and revealed positions. The input command may cause a processor to dynamically adjust the second display position or display settings.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DETAILED DESCRIPTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Any one or more of the servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

Figure 1:
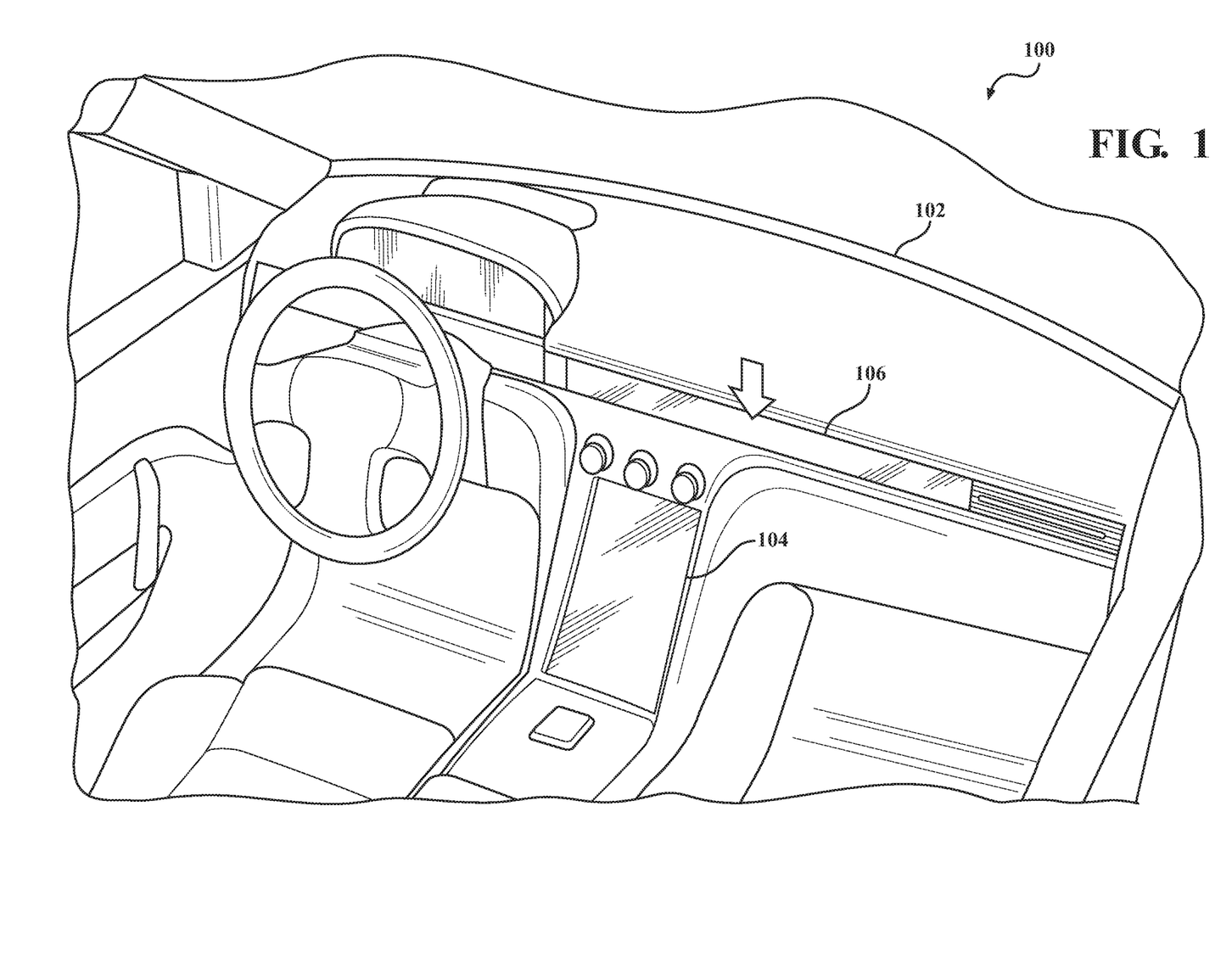
FIG. 1 is a perspective view of a vehicle interior with a plurality of devices in a first configuration.

FIG. 1 is a perspective view of one type of environment for a multi-user, multi-screen interface. The example shown in FIG. 1 is an interior cabin of an automotive vehicle 100 having an instrument panel 102, with which vehicle occupants, or users, may interact. The instrument panel 102 may include a plurality of display screens 104, 106 accessible to the users for controlling various vehicle systems such as an infotainment system, an audio system, an instrument cluster, a climate control system, and other vehicle systems such as seats, doors, windows, trunk, vehicle states related to drive systems such as four-wheel drive mode and cruise control to name some examples. The user interacts with various vehicle systems in order to power on-off and adjust the various vehicle systems.

The vehicle 100 may include one or more sensors inside and outside of the vehicle for monitoring the vehicle, the users and/or the environment. For example, one or more pressure sensors, temperature sensors, microphones, accelerometers, and cameras. Further, the vehicle 100 may include a communication link, or other sensor, for detecting and connecting to a mobile device such as a cellular phone, a tablet, a computer, a portable media player or other mobile computing device including small wearable devices. The communication link may be wired by way of, for example, a Universal Serial Bus (USB), a Mobile High-Definition Link (MHL), a High-Definition Multi-media interface (HDMI), and Ethernet. The communication link may be wireless, for example, Bluetooth, Wi-Fi, Wi-Fi Direct Near-Field Communication, cellular connectivity, etc. and configured to provide two-way communication between the mobile device and the in-vehicle computing system.

One or more applications may be operable on a mobile device or on an in-vehicle system for providing content. For example music playlists, contacts, calendars, location information, weather information, GPS or navigation route information, a user profile that may include preferences such as climate settings, seat settings, music volume settings, display configuration settings, other vehicle settings such as steering wheel controls, cruise control, headlight controls, pedal settings, etc.

Figure 2:
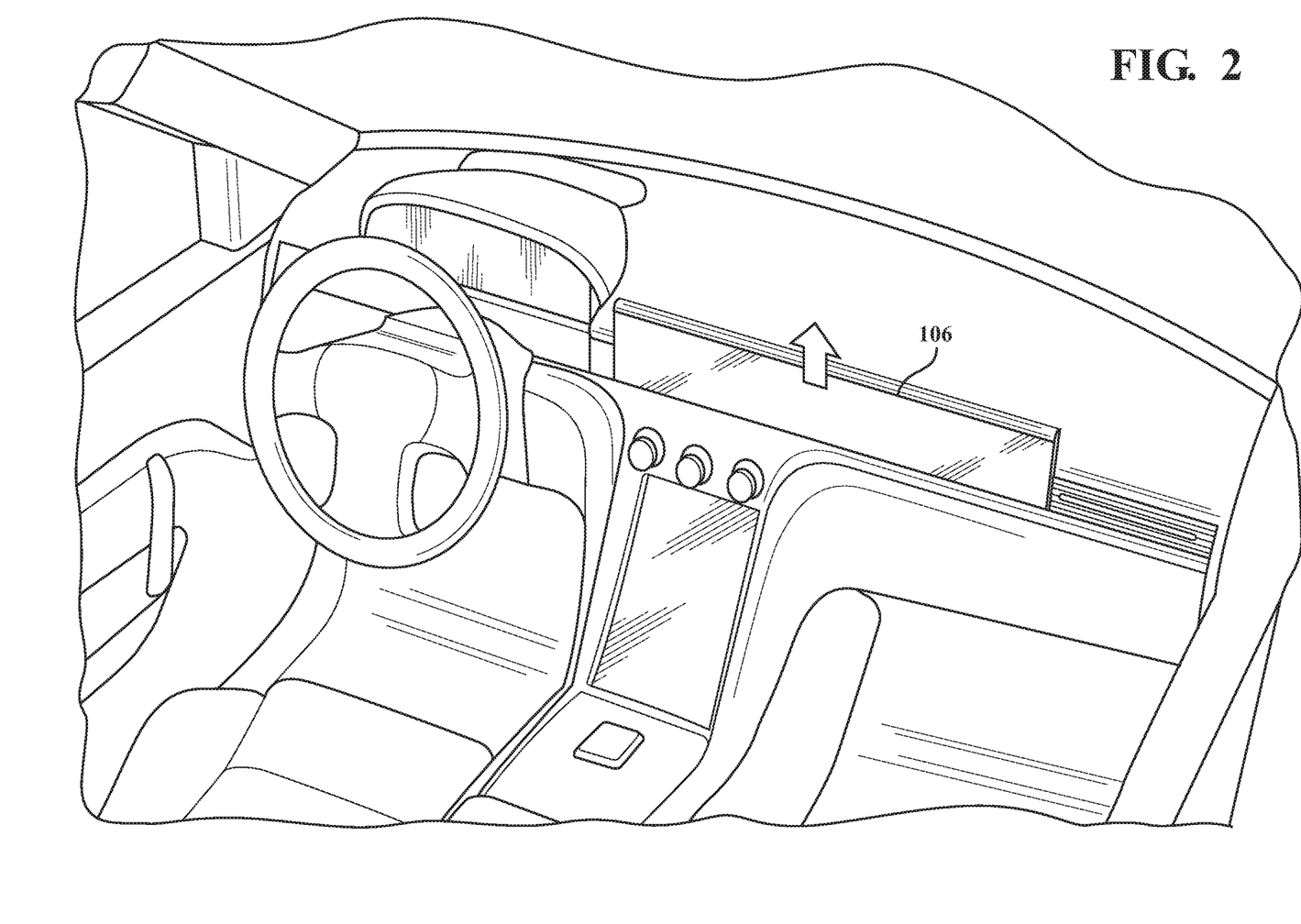
FIG. 2 is a perspective view of a vehicle interior with a plurality of devices in a second configuration.

The plurality of display devices, or display screens 104, 106 is shown as a first display screen 104 and a display second screen 106 for example purposes. While two screens are shown, it should be noted that any number and size screens from any number and type of devices may be managed to present content in such a manner that limits a user's cognitive overload. An input command that may be an user interactive command, such as an on-screen input/interaction/gesture/voice command or other event, allows a user or a vehicle system to select content to be moved to and displayed at an alternate screen, thereby causing articulation of the second screen 106 as shown in FIG. 2. Referring back to FIG. 1 which show's a first configuration for the first and second display screens 104, 106 where the second display screen is retracted into the vehicle instrument panel. An application running on the first display screen 104 may, for example, list upcoming appointments for the user. The user selects content, such as an appointment, and causes the selected content to be moved with an action that may be voice-activated or gesture-based action, such as with a swiping motion or touch. The selected content is moved to the edge of the first display screen 104. This action, gesture swiping motion, triggers articulation of the second screen 106. Referring now to FIG. 2, the second display screen 106 is adjusted to rise from its retracted position from within the instrument panel to then display content related to the selected appointment, such as a navigation map set to a destination of the selected appointment. The content being moved from the first display screen 104 to the second display screen 106 is analyzed and considered, along with other pertinent information available, such as a profile associated with the user, and displays the content in a manner that is created to best meet a cognitive load of the user.

Figure 3:
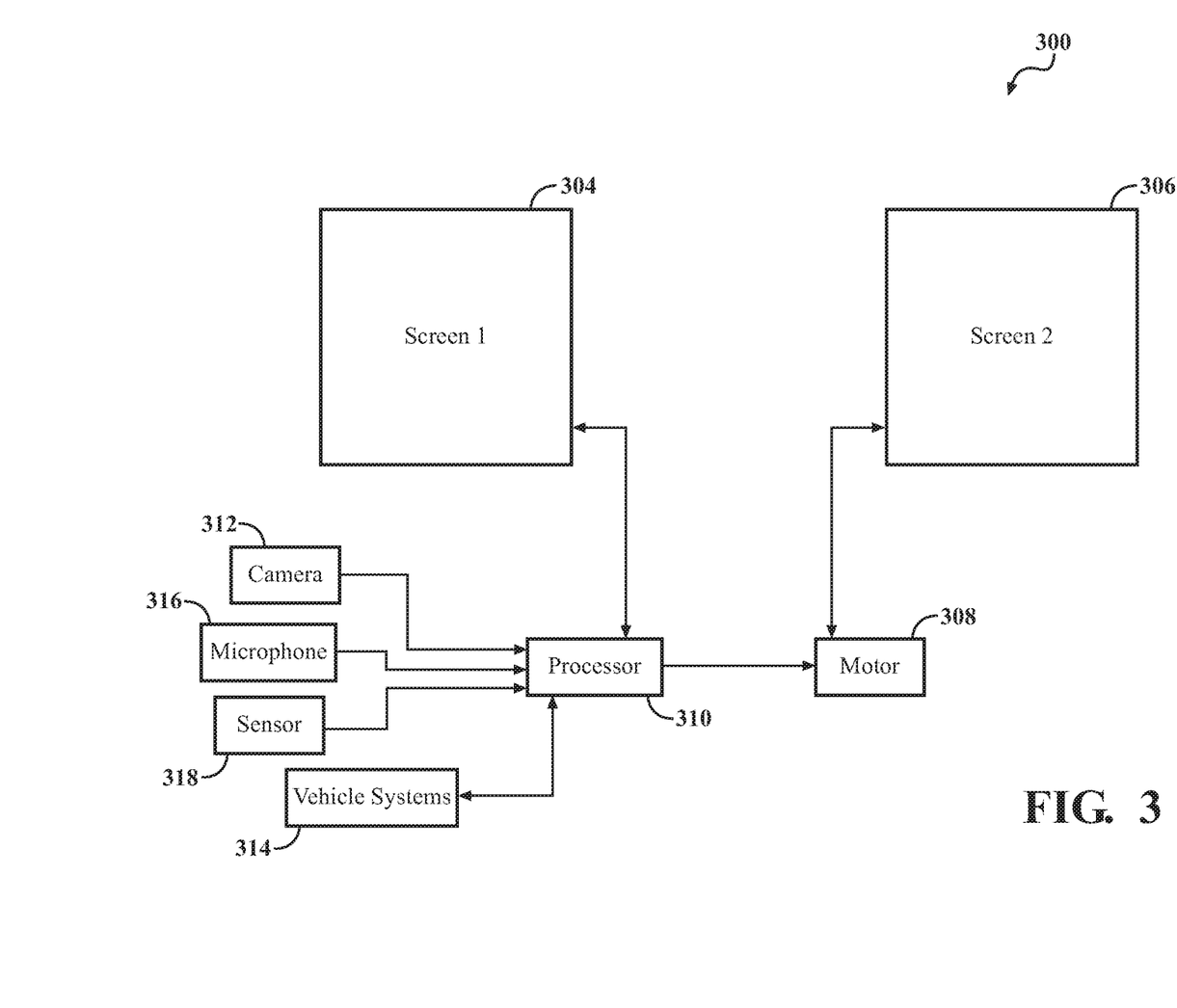
FIG. 3 is a block diagram of a system for contextual button-free articulation of a plurality of display screens.

Referring to FIG. 3, the system 300 includes a motor mechanism 308 connected to a processor 310 associated with the second display screen 306 which receives a signal from a processor 310 associated with the first display screen 304 that results in articulation of the second display screen 306 and instructions to display the content at the second display screen 306. The system includes processing algorithms that cause contextual information, or content, to be shown at the second display screen 306. Articulation of the screens may also be triggered by data inputs from other vehicle systems. Display settings such as brightness, contrast, resolution, scale, text size etc. as well as audio settings may also be considered as instructions to display the content.

A system may include an input element. The input element may be connected to a processor for determining next steps. For example, the input element may be a camera 312. The camera 312 takes an image of a user and recognizes, or otherwise identifies the user. In response to identifying the user, the processor 310 retrieves a stored user profile that is associated with the identified user and loads the stored profile to be used by various vehicle systems 314 such as adjusting the climate control, loading a calendar, tuning to a particular radio station, seat settings, etc. The camera 312 and processor 310 may, additionally or alternatively, be used to identify an action, such as a gesture from the user. By way of the gesture, the processor may determine that content from the first display screen 304 may be pushed to a second device, such as the second display screen 306. Alternatively, the input element may be a microphone 316 to detect an action such as an audible command or other sensor 318 such as an infrared sensor.

The system 300, in response to a first action, such as a gesture or a voice command by the user, causes content to be pushed from a first device to a second device. Additionally, content may be pushed from the first device to other devices, such as other displays within the vehicle such as displays in the instrument panel or mobile computing or other portable devices such as a smart phone, a tablet or a wearable device. As one example, the first device may be a smart phone, and the second device may be a display in a vehicle. While in a resting position as shown in FIG. 1, the second display 106 in the vehicle may be concealed within an instrument panel of the vehicle. In response to detecting the first gesture, the second display 106 may raise up from the resting position to a revealed position as shown in FIG. 2. The revealed position may be dependent upon the content to be pushed. Alternatively, the revealed position may be a maximum state. The processor may analyze the content from the first device and determine how far the display should extend from the instrument panel. Therefore, if the content from the first device is displayed at a resolution of 640×960, then the content may also be displayed at the second device at a resolution of 640×960.

Figure 4:
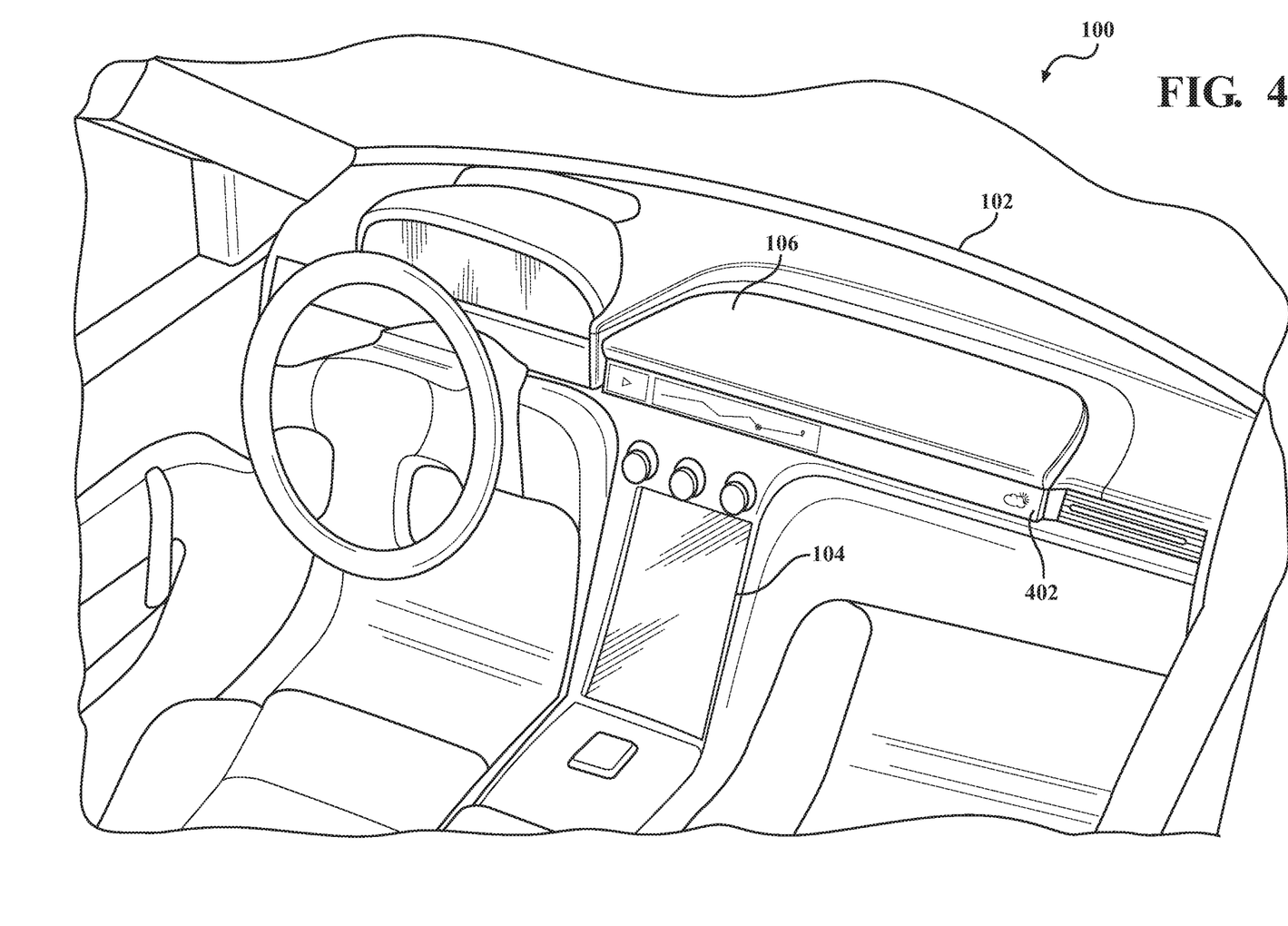
FIG. 4 is a perspective view of a vehicle interior with a second display device in a first configuration.
Figure 5:
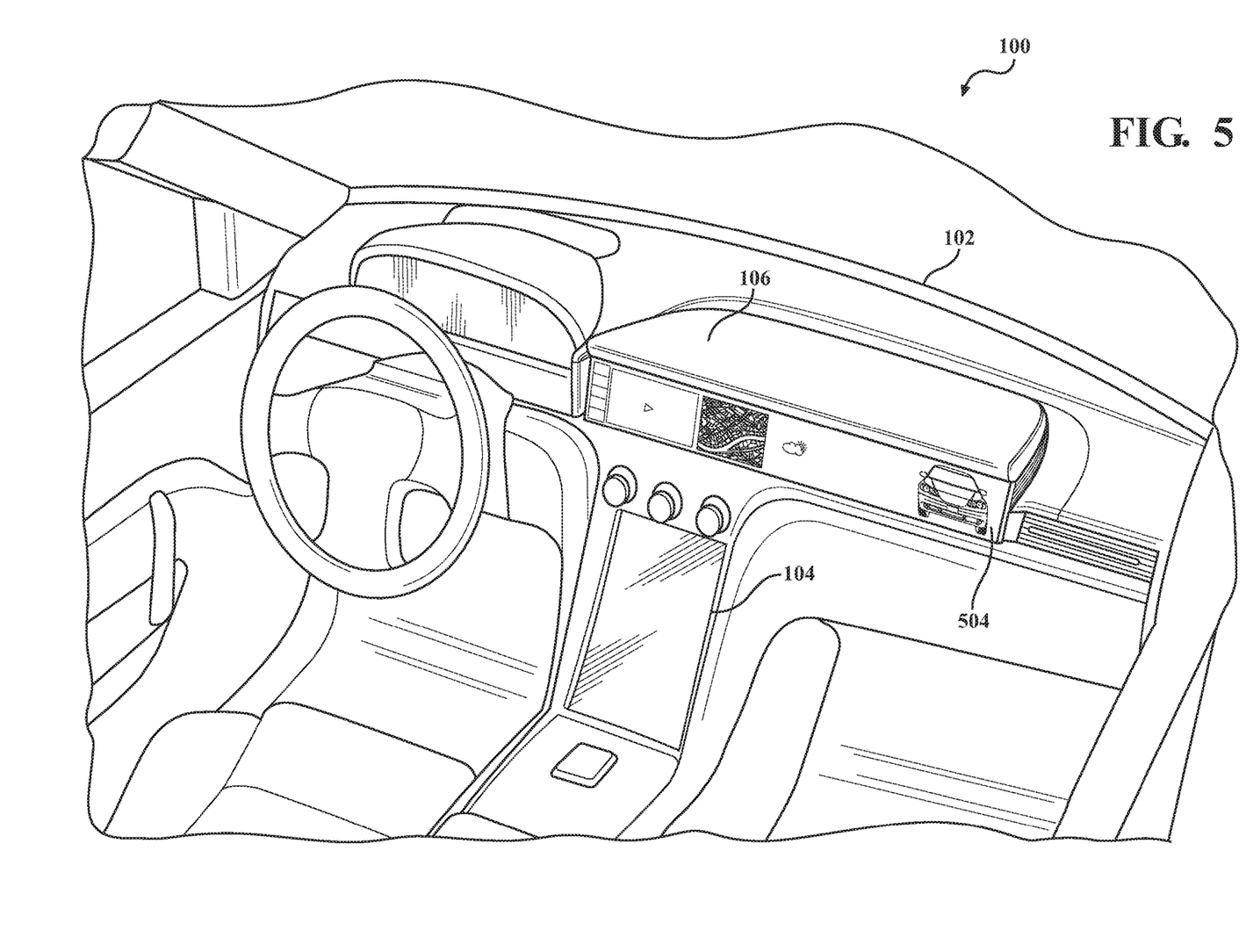
FIG. 5 is a perspective view of a vehicle interior with a second display device in a second configuration.

Alternatively, the processor may determine another resolution and another sizing for the display. This may be based on the user's profile. For example, the user's profile may have a set resolution for the display or a factor to zoom/magnify in response to receiving content from the first device. If the user prefers the sizing of the content or the sizing of the display to be adjusted, the user may make a second action or gesture. In response to the second action, the processor may make the adjustment accordingly. See FIGS. 4 and 5. Referring to FIG. 4, the second display 106 is in a first display position 402 that is not completely retracted, but raised to a predetermined position with a first predetermined resolution. Referring now to FIG. 5, the second display 106 is in a second display position 502 that is different than the first display position. Also, the resolution may be adjusted to reflect the second display position.

Alternatively, the processor may analyze the user's behavior/response to the content being displayed on the display and proactively either make or suggest changes: Would you like me to magnify/zoom in on the content, enlarge the display, switch to another display, stop showing the content, etc. In response to another user's action, the content may be turned off from the display or otherwise moved from the display, and the display may be lowered into the concealed position. The display may also be turned off or the content moved from the display based on the user's profile. For example, after content playback ends, such as when an audio message ends, a video message ends, etc., and the user's preference is to return the display to the concealed position the display automatically returns to its concealed position. The system may therefore dynamically scale/fit the content and/or display. Additionally or alternatively, the system may select or recommend certain sized content be displayed on certain displays. The system may include an abort/cancel feature for either ending content on the display early or returning a revealed display to a concealed state early.

When a user enters a vehicle, the onboard displays may be powered up and/or placed in a standby mode. Certain displays may be moved into revealed positions from concealed positions based on a user's profile. Alternatively, the user may make one or more actions, which in turn cause one or more of the displays to be moved to the revealed positions. Similarly, the user may make one or more actions to cause one or more of the displays to be returned to the concealed positions.

Alternatively, upon detecting that a user has left the vehicle, the displays may be automatically returned to the concealed positions. The concealed positions may be in door panels, a center stack, a mid-console, a ceiling, an A-pillar, a headrest, etc. The return may be based on a time-delay. For example, return to a concealed position when the user is no longer detected and a predetermine amount of time has lapsed.

Additionally or alternatively, this may be based on detecting that no other users are located in the vehicle. If alternative users are located in the vehicle, one or more of their user profiles may be defaulted to. This may be based on a hierarchical scheme—e.g., use Person B's profile over C's, if B and C are present. A user (such as the defaulted to user) may instruct the system to select a different profile. For example, B may instruct the system to use C's instead.

Additionally or alternatively, the onboard displays may be powered up when the vehicle is started or the ignition is set to on. Thus, the onboard displays may be powered up as part of the start-up procedure of the vehicle. This may also include selecting and/or raising one or more displays. Similarly, the onboard displays may be powered down as part of a power-down procedure of the vehicle. That may be in response to the vehicle being turned off.

Alternatively, the displays may be kept in a standby mode, as with one or more other systems of a vehicle, regardless of whether the vehicle is turned on or off. This may be so long as the vehicle's power system includes enough electrical energy to do so. One reason for this may be to keep the displays/system within a certain temperature range. Thus, a vehicle that has been sitting in freezing temperatures (0 degrees Celsius or lower) is readily available to act. As opposed to first going through a temperature warm-up routine. Similar approach may be for higher temperatures, such as greater than 25 degrees Celsius.

Additionally, when multiple users are present, the system may be used by each of the users. For example, a first user may push content from a first device to a second device by a first action. A second user may also have the system push the content from the first device to a third device. This may be by a second action. Alternatively, the second user may push content from a third device to a fourth device by another action.

The system may replicate content in its entirety (e.g., the content from the first device is in its entirety pushed to the second device, such that the entire content is displayed on the second device). Alternatively, the system may replicate/push a portion of the content from the first device to the second device. For example, the first device may show diagnostic information, such as speed, RPM, temperature, etc., along with navigational information, such as a navigational route, a heading, etc. Either all of that may be pushed to the second device or a portion of that, such as just the navigational route, may be pushed to the second device. The system may be setup to instruct the first device that it is pulling all or part of the content. Additionally, the system may instruct the first device that in response to pulling all of the content, the first device may go into a standby mode, stop showing the content, etc. That may be desirable to conserve power, for there may not be a need to duplicate the same content on multiple devices. There may, however, be times where such duplication is needed or desired. Similarly, when a portion of the content is pulled from the first device, the system may instruct the first device that it no longer needs to show that portion of the content on the first device (for the portion is now pushed and showed on the second device). The non-pulled/non-pushed content may, however, continue to be shown on the first device. For example, if the heading is pulled from the first device and pushed to the second device, but the navigational route is not, then the first device may stop displaying the heading, but continue showing the navigational route.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A system for directing content among a plurality of display devices, the system comprising:
    a first device having a first display for displaying content that may be selected;
    at least a second device having a second display;
    a motor mechanism in communication with the second device for adjusting a position of the second device;
    an input command causing content displayed at the first device to be selected; and
    a processor in communication with the first device, at least the second device and the motor mechanism wherein the processor receives the input command from the first device, causes the motor mechanism to adjust a position of the second device, the processor dynamically adjusts the position of the second device and display settings of the second device based on the selected content causing the selected content to be displayed by at least the second device.

2. The system as claimed in claim 1 wherein the first device is a portable device and the input command is sent by the portable device.

3. The system as claimed in claim 1 wherein the first device is a vehicle system and the input command is sent by a vehicle system.

4. The system as claimed in claim 1 wherein the processor adjusts the display settings causing the selected content to be displayed by the second device at a predetermined resolution.

5. The system as claimed in claim 1 wherein the input command is a user interactive command, the system further comprises a plurality of users and the user interactive command is a gesture-based command received by a camera in communication with the processor, the interactive command may come from any one of the plurality of users.

6. The system as claimed in claim 1 wherein:
    the input command is determined from at least one user profile stored in a memory and is partially based on detection of one or more users and a user profile that may be associated with each user;
    the at least one user profile is selected from a plurality or user profiles, the at least one user profile determines the position and display settings for the selected content to be displayed by at least the second device; and
    a hierarchical scheme is used to select the at least one user profile from the plurality of user profiles.

7. The system as claimed in claim 1, further comprising:
    a second input command from a user; and
    the processor receives the second input command and causes the motor mechanism to further adjust a position of the at least second device and further adjust the display settings of the selected content at the second device.

8. The system as claimed in claim 1, further comprising:
    a second input command coming from the processor, the second input command is determined from an algorithm analyzing a user reaction detected by the processor in association with the selected content; and
    the processor receives the second input command and causes the motor mechanism to further adjust a portion of the second device and further adjust the display settings of the selected content at the second device.

9. The system as claimed in claim 1 wherein the input command received by the processor causes the motor mechanism to adjust the position or display of the second device from a concealed position to a revealed position, the concealed position is selected from the group consisting of; a door panel, a center stack, a mid-console, a ceiling, an A-pillar, a headrest.

10. The system as claimed in claim 1 wherein the input command received by the processor causes the motor mechanism to adjust the position or display of the second device from a concealed position to a revealed position, the system further comprising:
    a second input command; and
    the processor receives the second input command when playback of the selected content is complete, the second input command received by the processor causes the motor mechanism to adjust the position or display settings of the second device from the revealed position to the concealed position.

11. The system as claimed in claim 10 wherein the second input command is received after a predetermined amount of time has lapsed.

12. The system as claimed in claim 1 wherein the processor dynamically adjusts the position and display settings of the second device based on a user profile stored in a memory.

13. The system as claimed in claim 1 wherein the content selected from the first device is replicated at the second device.

14. The system as claimed in claim 1 wherein the content selected from the first device is displayed at the second device and the selected content is no longer displayed at the first device.

15. A system for directing content among a plurality of display devices, the system comprising:
    a plurality of devices positioned throughout a vehicle interior, each device in the plurality of devices having a display adjustable between a concealed position and a revealed position;
    a mechanism in communication with at least one device in the plurality of devices for adjusting the display between the concealed position and the revealed position;
    a processor having a non-transitory computer-readable storage medium, the processor in communication with each device and the mechanism, the processor is capable of executing instructions, stored on the non-transitory computer-readable storage medium;
    an input command generated to select content from a first display, adjust the mechanism in communication with at least a second display to the revealed position to display the selected content by at least a second display, the input command to adjust the mechanism is generated by a vehicle system in response to the selected content; and
    upon receiving the input command at the processor, the at least a second display is adjusted to the revealed position and selected content is displayed by the second display.

16. The system as claimed in claim 15 wherein the vehicle system is accessing a stored user profile to generate the input command based on preferences associated with the stored user profile.

17. The system as claimed in claim 16 wherein the stored user profile is selected by a camera sensor that recognizes a user and applies a user profile, stored in a memory, having preferences associated with the recognized user.

18. The system as claimed in claim 16 wherein the stored user profile is selected by a microphone sensor that recognizes a user and applies a user profile, stored in memory, having preferences associated with the recognized user.

19. The system as claimed in claim 16 wherein the stored user profile further comprises an input command that is applied at start up and power down of the vehicle causing one or more the devices in the plurality of devices to adjust the position of the display associated with the one or more devices.

20. The system as claimed in claim 15 wherein the revealed position further comprises features selected from the group consisting of: a physical position of the device, a display resolution, a display brightness, a display contrast, a text size of selected content, a scale of the selected content, and an audio settings of the selected content.

21. The system as claimed in claim 15 wherein the positions of the devices are selected from the group consisting of: a door panel, a center stack, a console, a ceiling, an A-pillar, a headrest, and an instrument panel.

22. The system as claimed in claim 16 wherein the vehicle system selects more than one user profile from a plurality of user profiles based on recognition of more than one user in the vehicle, the more than one user profile from a plurality of user profiles are applied by the vehicle system based on a hierarchical scheme.

23. The system as claimed in claim 16 further comprising a temperature sensor and the input command is dependent upon a predetermined operating temperature.

24. The system as claimed in claim 16 wherein the input command further comprises:
   a first input command triggered by a vehicle system event; and
   at least a second input command triggered by a user initiated event, the user initiated event is selected from the group consisting of: a touch input, a device interaction, a physical gesture, and a voice command, the at least a second input command alters the position of the second display from the position generated by the first input command.

25. The system as claimed in claim 24 further comprising:
   the first input command triggered by a first event selects content and pushes content from a first device to a second device; and
   the at least a second input command triggered by a second event further adjusts the position of the second device.

* * * * *